(12) United States Patent
Rouhana et al.

(10) Patent No.: US 9,537,792 B2
(45) Date of Patent: Jan. 3, 2017

(54) CHANNEL LOADING FOR ONE-TO-MANY COMMUNICATIONS IN A NETWORK

(71) Applicant: QUALCOMM Incorporated, San Diego, CA (US)

(72) Inventors: Rouhana Rouhana, Ocala, FL (US); Hassan Kaywan Afkhami, Ocala, FL (US); Srinivas Katar, Gainesville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 335 days.

(21) Appl. No.: 14/015,518

(22) Filed: Aug. 30, 2013

(65) Prior Publication Data
US 2015/0063370 A1    Mar. 5, 2015

(51) Int. Cl.
| | |
|---|---|
| *H04L 27/34* | (2006.01) |
| *H04L 12/911* | (2013.01) |
| *H04L 12/801* | (2013.01) |
| *H04L 5/00* | (2006.01) |

(52) U.S. Cl.
CPC ............. *H04L 47/828* (2013.01); *H04L 5/001* (2013.01); *H04L 5/006* (2013.01); *H04L 5/0041* (2013.01); *H04L 5/0071* (2013.01); *H04L 47/15* (2013.01); *H04L 27/34* (2013.01)

(58) Field of Classification Search
CPC ...... H04W 36/30; H04W 36/18; H04W 36/08; H04W 36/14; H04W 36/12; H04L 47/828; H04L 47/15; H04L 5/001; H04L 5/0041; H04L 5/006; H04L 5/0071; H04L 27/34
See application file for complete search history.

(56) References Cited

U.S. PATENT DOCUMENTS

| | | |
|---|---|---|
| 8,416,782 B2 | 4/2013 | Kim et al. |
| 2007/0237254 A1 | 10/2007 | Pi |
| 2010/0309834 A1 | 12/2010 | Fischer et al. |
| 2011/0019603 A1 | 1/2011 | Jeon et al. |
| 2011/0044338 A1 | 2/2011 | Stahl et al. |

(Continued)

OTHER PUBLICATIONS

"PCT Application No. PCT/US2014/053329 International Search Report", Nov. 20, 2014, 10 pages.

(Continued)

*Primary Examiner* — Ted Wang
(74) *Attorney, Agent, or Firm* — DeLizio Law, PLLC

(57) ABSTRACT

A master network device determines to transmit data from the master network device to a plurality of client network devices of a network. In one example, the master network device can generate a data frame including a payload with a plurality of symbols. The payload may include at least one symbol allocated for each of the client network devices. The plurality of symbols may be arranged in a predefined pattern in the payload. In another example, the master network device may generate a data frame including a payload with one or more symbols. Each symbol may include a plurality of frequency carriers, and may include at least one frequency carrier allocated for each of the client network devices. The plurality of frequency carriers can be allotted to the client network devices according to a partitioning pattern. The master network device then transmits the data frame to the client network devices.

21 Claims, 9 Drawing Sheets

(56) References Cited

U.S. PATENT DOCUMENTS

| | | | |
|---|---|---|---|
| 2011/0222408 A1* | 9/2011 | Kasslin | H04L 41/083 370/241 |
| 2011/0317630 A1 | 12/2011 | Zhu et al. | |
| 2012/0057471 A1 | 3/2012 | Amini et al. | |
| 2013/0182798 A1* | 7/2013 | Lozano | H04L 65/4084 375/340 |
| 2013/0287045 A1* | 10/2013 | Oksman | H04B 3/54 370/474 |
| 2016/0014047 A1 | 1/2016 | Rouhana et al. | |

OTHER PUBLICATIONS

"PCT Application No. PCT/US2014/053329 Written Opinion", Aug. 31, 2015, 6 pages.

"PCT Application No. PCT/US2014/053329 International Preliminary Report on Patentability", Nov. 30, 2015, 8 pages.

"IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications; IEEE", Jun. 12, 2007, pp. C1-C1184.

* cited by examiner

CHANNEL LOADING FOR ONE-TO-MANY COMMUNICATIONS IN A NETWORK

BACKGROUND

Embodiments of the inventive subject matter generally relate to the field of communication systems, and, more particularly, to channel loading for one-to-many communications in a network.

Communication systems (such as Ethernet-over-Coax systems) typically use separate Physical Layer Protocol Data Units (PPDUs) for downstream one-to-many communication from a master network device to multiple client network devices. Using separate PPDUs leads to increased overhead which can significantly reduce channel loading efficiency. For example, header information included in each of the PPDUs can lead to an increase in the overhead. Also, after transmitting a first PPDU, the master network device may wait for an acknowledgement for the first PPDU before transmitting a second PPDU. The gap between transmissions may also reduce the channel loading efficiency.

SUMMARY

Various embodiments are disclosed for implementing channel loading for one-to-many communications in a communication network. For example, a master network device can determine to transmit data to a plurality of client network devices of the communication network. In one embodiment, the master network device may generate a data frame including a payload with a plurality of symbols. The payload can include at least one symbol allocated for each of the client network devices. The plurality of symbols may be arranged in a predefined pattern in the payload that is known to the client network devices. The master network device then transmits the data frame to the client network devices. In another embodiment, the master network device may generate a data frame including a payload with at least one symbol. The symbol may include a plurality of frequency carriers. The plurality of frequency carriers may include at least one frequency carrier allocated for each of the client network devices. The plurality of frequency carriers can be allotted to the client network devices according to a partitioning pattern. The master network device then transmits the data frame to the client network devices.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to a master network device communicating with two client network devices using a single PPDU, embodiments are not so limited. In some embodiments, the master network device may communicate with more than two client network devices using a single PPDU. It is also noted that in some embodiments, the master network device may determine subsets of client network devices in a communication network, and the master network device may utilize a single PPDU for downstream communication with each of the subsets of the client network devices. In other instances, well-known instruction instances, protocols, structures and techniques have not been shown in detail in order not to obfuscate the description.

In some embodiments, for downstream communication with client network devices, a master network device can utilize a transmission channel using a time-domain technique or a frequency-domain technique for efficient channel loading. Instead of transmitting separate data frames to each of the client network devices over the transmission channel, the master network device can generate a data frame that includes a plurality of data symbols (e.g., orthogonal frequency-division multiplexing (OFDM) symbols) for the client network devices. In one implementation, using the time-domain technique, the master network device can generate the data frame including at least one data symbol for each of the client network devices. The data symbols may be arranged in a predefined pattern in the payload of the data frame. For example, the data symbols may be arranged in an alternating sequence that is known to the client network devices. In another implementation, using a frequency-domain technique, the master network device can allocate one or more frequency carriers in a communication spectrum to each of the client network devices for data transmission. The master network device can generate the data frame including one or more data symbols. Each of the data symbols may include a plurality of frequency carriers that are allocated to the client network devices. For example, in the frequency-domain technique, the master network devices can allocate at least one frequency carrier to each of the client network devices, as will be further described below. The data symbols in the data frame collectively include data for the client network devices. For example, a data symbol may include data for two client network devices based on the frequency carriers in the communication spectrum allocated to the two client network devices.

Figure 1:
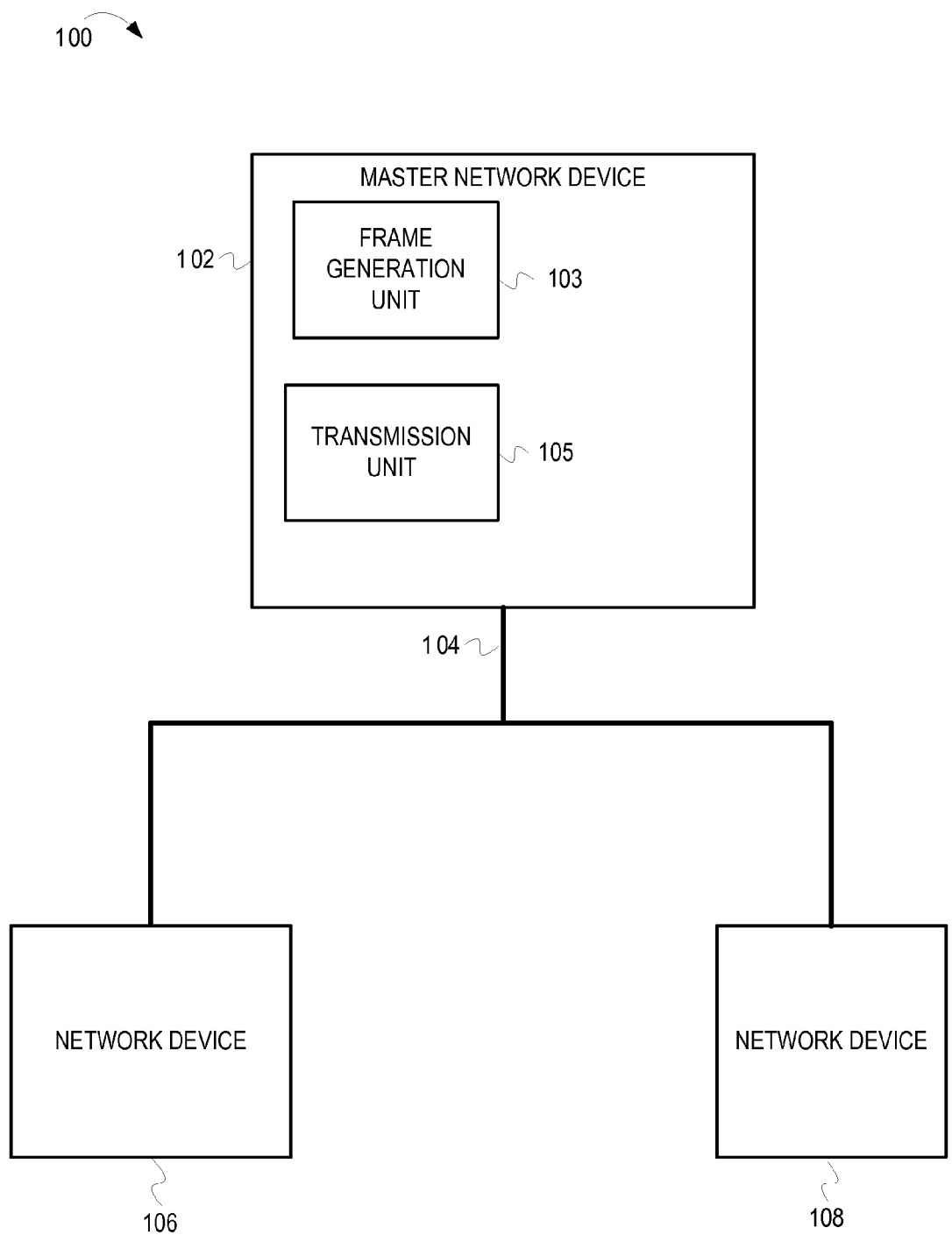
FIG. 1 depicts an example conceptual diagram of one-to-many communications in a communication network.

FIG. 1 depicts an example conceptual diagram of one-to-many communications in a communication network. FIG. 1 includes a communication network 100 (e.g., an Ethernet-over-coax network, etc.). The communication network 100 includes a master network device 102 having a frame generation unit 103 and a transmission unit 105. The communication network 100 also includes a client network device 106, and a client network device 108 coupled to the master network device 102 (and to each other) via a communication medium 104. The master network device 102 may be a server, a network hub, a gateway/router, a home network controller, a gaming console, or other network device that performs downstream communication with a plurality of client network devices (e.g., the client network devices 106 and 108). The client network devices may be electrical/electronic devices (e.g., a television, a notebook computer, a tablet computer, a smart appliance, etc.). In one example, the master network device 102 may be a network hub that can send video streams to the client network devices 106 and 108 that have video display and/or storage capabilities. The communication medium 104 may be a communication medium based on the type of communication network 100 (e.g., a PLC medium for a PLC network, a coaxial cable for an Ethernet-over-coax network, etc.). The communication medium 104 may be a shared medium for communication between the master network device 102 and each of the client network devices 106 and 108.

The master network device 102 can send downstream communications to each of the client network devices 106 and 108 over the communication medium 104. In some implementations, the data sent to the client network devices 106 and 108 may be similar (e.g., same video stream sent to each of the client network devices 106 and 108). In other implementations, the data sent to each of the client network devices 106 and 108 may be different (e.g., an audio stream sent to the client network device 106, and a video stream sent to the client network device 108). The master network device 102 can implement efficient channel utilization by combining data frames to be transmitted to the client network devices 106 and 108. For example, the master network device 102 can generate a single data frame that includes data to be sent to each of the client network devices 106 and 108. In one specific example, each of the data frames constructed and transmitted by the master network device 102 can have data associated with an audio stream destined for the client network device 106, and data associated with a video stream destined for client network device 108. The master network device 102 can reduce transmission overhead and transmission time on the communication medium 104 by combining data destined for multiple client network devices in each data frame (as described below in FIGS. 3 and 4).

In some implementations, the frame generation unit 103 can generate a data frame for transmission to each of the client network devices 106 and 108. For example, the frame generation unit 103 can generate a PPDU having data symbols for the client network devices 106 and 108. For example, the frame generation unit 103 can generate a PPDU having OFDM symbols transmission to the client network devices 106 and 108. In one implementation, the frame generation unit 103 can generate the data frame using a time-domain technique for efficient channel loading. For example, in the time-domain technique, the frame generation unit 103 may include one or more data symbols for each of the client network devices 106 and 108 in the data frame (as described below in FIG. 3). In another implementation, the frame generation unit 103 can generate the data frame using a frequency-domain technique for efficient channel loading. For example, in the frequency-domain technique, the frame generation unit 103 may determine one or more frequency carriers in a frequency spectrum (e.g., a frequency spectrum for communication over a coaxial medium, etc.) for each symbol to be utilized for transmissions to each of the client network devices 106 and 108. The frame generation unit 103 can then generate the data frame including one or more data symbols, where each symbol can include at least one frequency carrier that is allocated to each of the client network devices 106 and 108 (as described below in FIG. 4).

The frame generation unit 103 can reduce the transmission overhead for transmissions to the client network devices and utilize the communication medium efficiently by generating a data frame that includes a plurality of data symbols allocated to the client network devices 106 and 108. The frame generation unit 103 can reduce the transmission overhead by combining the header information (e.g., a preamble, a frame control field, etc.) that is usually transmitted separately in two or more different data frames (e.g., for the client network devices 106 and 108). For example, the frame generation unit 103 can include the combined header information associated with the client network devices 106 and 108 into a single data frame, as will be further described below. Also, in existing one-to-many communication techniques, when data frames are separately transmitted to each of the client network devices, the master network device 102 may have to wait between transmissions to client network devices in the communication network 100. For example, after the master network device 102 transmits a data frame to the client network device 106, the master network device 102 may have to wait for an acknowledgement from the client network device 106 before it can transmit a data frame to the client network device 108. In other words, the master network device 102 may wait for the acknowledgement from the client network device 106 before it can utilize the communication medium 104 for transmissions to another client network device. By generating the data frame having data symbols for the client network devices 106 and 108, the frame generation unit 103 can reduce the latency between the data received at the client network devices 106 and 108 from the master network device 102 and improve synchronization between the client network devices 106 and 108.

In some implementations, the transmission unit 105 can transmit a data frame generated by the frame generation unit 103 to each of the client network devices 106 and 108. In some examples, the transmission unit 105 may modify one or more fields of the data frame generated by the frame generation unit 103 to transmit the data frame on the communication medium 104. For example, the transmission unit 105 may insert an error detection and/or error correction code (e.g., Checksum, Cyclic Redundancy Check, etc.) to help ensure integrity of the data transmitted from the master network device 102. The transmission unit 105 can then transmit the data frame on the communication medium 104.

Figure 2:
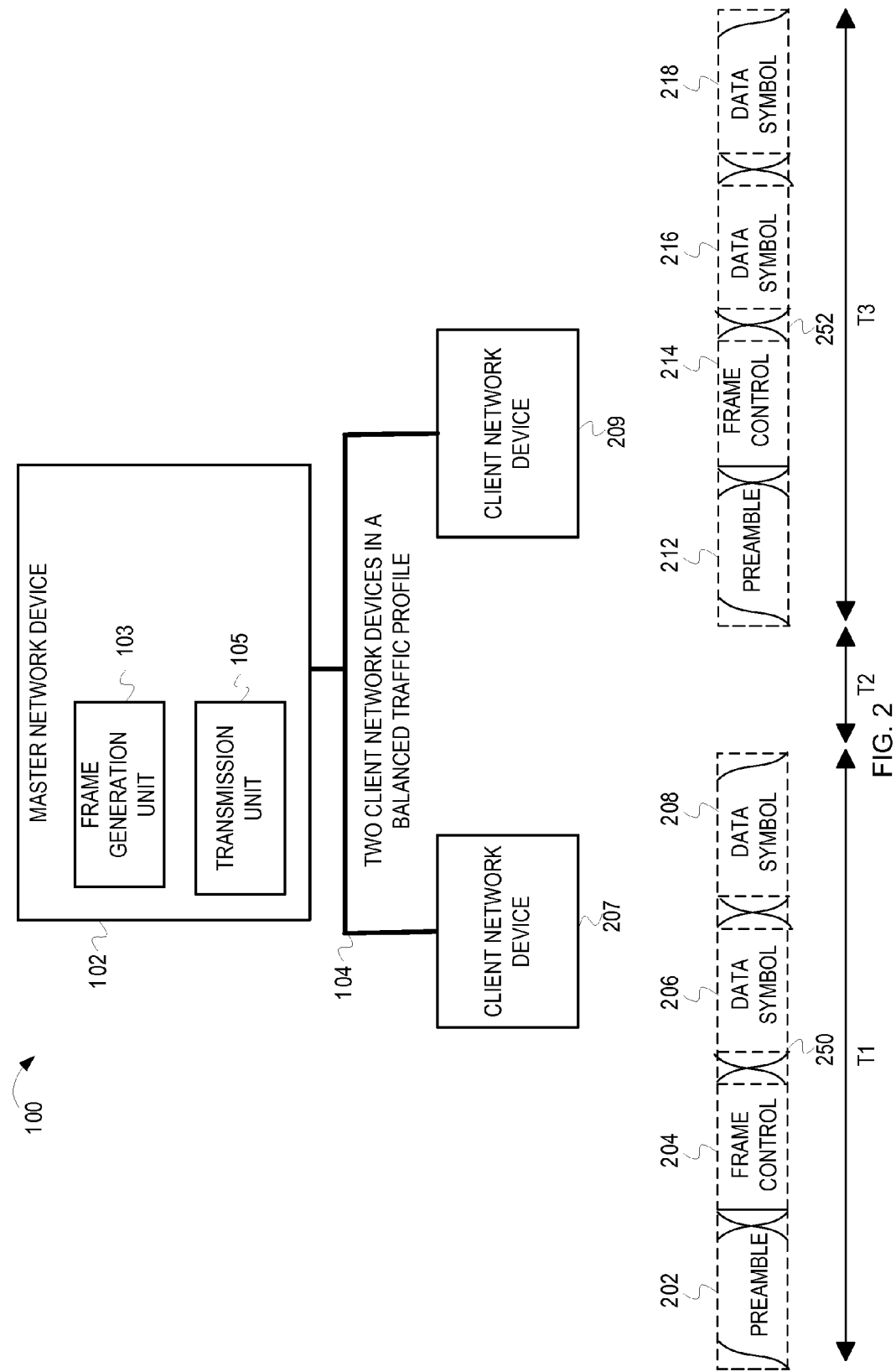
FIG. 2 depicts an example conceptual diagram of downstream communication from a master network device to two client network devices using a balanced traffic profile.

FIG. 2 depicts an example conceptual diagram of downstream communication from a master network device to two client network devices using a balanced traffic profile. FIG. 2 depicts the communication network 100 (as described above with reference to FIG. 1), a PPDU 250, and a PPDU 252. The communication network 100 includes the master network device 102 having the frame generation unit 103 and the transmission unit 105, a client network device 207, and a client network device 209 coupled via the communication medium 104. The client network devices 207 and 209 are similar to the network devices 106, 108. FIG. 2 illustrates the master network device 102 providing downstream transmissions to the client network devices 207 and 209 according to a balanced traffic profile. For example, when operating according to the balanced traffic profile, the client network devices 207 and 209 can receive similar throughput from the master network device 102. The client network devices 207 and 209 may receive data at approximately equal data rates from the master network device 102. For example, data rates to the client network devices 207 and 209 may be approximately equal when the data rates are within a predefined percentage of each other. In one example, the data rate to the client network device 207 may be within 5% of the data rate to the client network device 209. In another example, the data rate to the client network device 207 may be within 10% of the data rate to the client network device 209.

The PPDU 250 includes a preamble 202, a frame control field 204, a data symbol 206, and a data symbol 208. The data symbols 206 and 208 include encoded data (e.g., OFDM symbols encoded using Multi-Level Quadrature Amplitude Modulation (M-QAM)) to be sent to the client network device 207. The preamble 202 may include one or more bits that allow the client network devices to establish bit synchronization (which will be further described below). The frame control field 204 may include a source address (e.g., a network address of the master network device 102), and one or more destination addresses (e.g., a network address of the client network device 207 and a network address of the client network device 209). Similarly to the PPDU 250, the PPDU 252 includes a preamble 212, frame control field 214, a data symbol 216, and a data symbol 218. The data symbols 216 and 218 include encoded data to be sent to the client network device 209. In existing one-to-many communication techniques, the PPDU 250 may be sent in a downstream transmission from the master network device 102 to the client network device 207, and the PPDU 252 may be sent in a separate downstream transmission from the master network device 102 to the client network device 209. T1 represents the time on wire for transmission of the PPDU 250 on the communication medium 104, and T3 represents the time on wire for transmission of the PPDU 252 on the communication medium 104. T2 represents a time interval between transmission of the PPDU 250 and the PPDU 252 from the mater network device 102. For example, after transmitting the PPDU 250, the master network device 102 may wait for an acknowledgement from the client network device 207 (during the time interval T2) before transmitting the PPDU 252. In some implementations, after transmission of the PPDU 250 to the client network device 207, other network devices in the communication network 100 may contend for access to the communication medium 104 during the time interval T2. The length of T2 may be variable based on access to the communication medium 104 by other network devices, which may result in a delayed transmission of the PPDU 252 to the client network device 209.

FIG. 2 represents transmission of the PPDUs 250 and 252 to the client network devices 207 and 209, respectively. The master network device 102 may transmit the PPDU 250 to the client network device 207 followed by the PPDU 252 to the client network device 209. A transmission latency between the master network device 102 and the client network device 207 can be determined based on the value of T1. Similarly, a transmission latency between the master network device 102 and the client network device 209 can be determined based on the value of T1 +T2 +T3. A synchronization gap is the difference in time of arrival of data frames (i.e., the data frames transmitted from the master network device 102) at the client network devices 207 and 209. The synchronization gap for the reception of the PPDU 250 at the client network device 207 and the reception of the PPDU 252 at the client network device 209 is based on the value of (T2 +T3). Due to contention of the communication medium by network devices in the communication network 100, the value of T2 may be variable and can significantly affect the transmission latency to the client network device 209 and also the synchronization gap between the client network device 207 and 209. In some cases, to reduce latency and improve synchronization, the values of T1 and T3 may be reduced (e.g., by reducing the data symbols in the PPDUs 250 and 252). However, a reduction in the values of T1 and T3 may lead to inefficient channel loading. For example, due to an increase in an overhead ratio (i.e., the ratio of the size of the header information to the payload in a PPDU) of the PPDUs 250 and 252 with reduced data symbols, channel loading may be inefficient.

Figure 3:
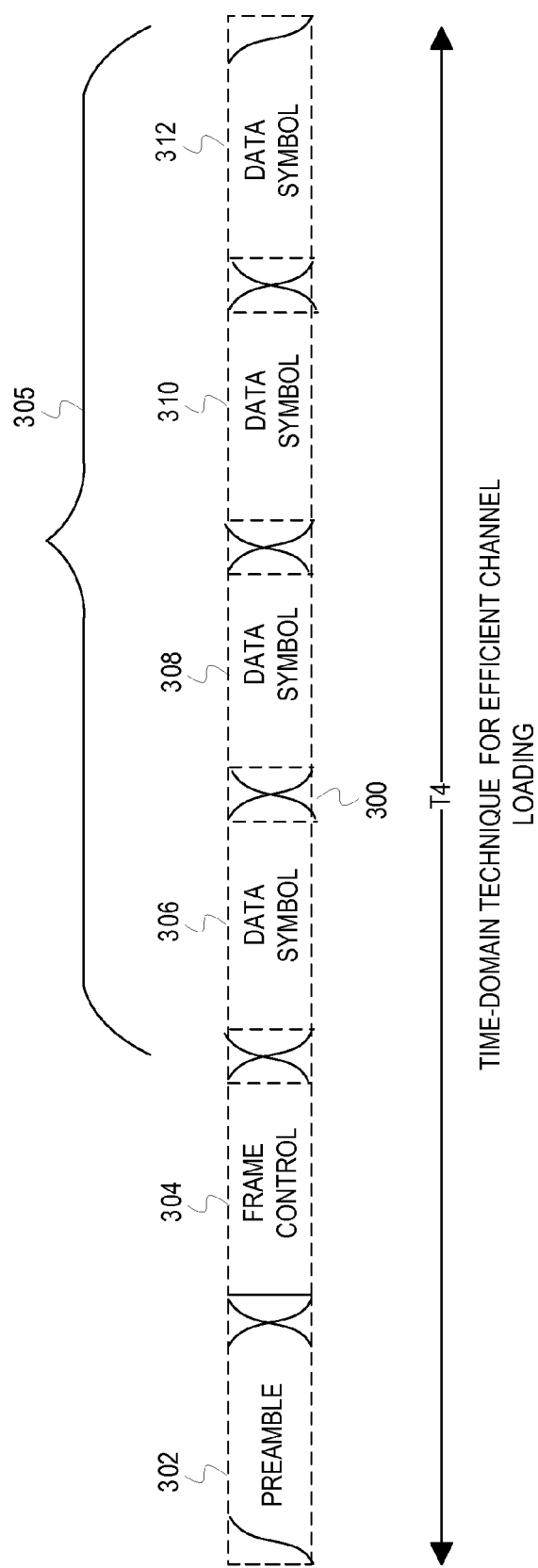
FIG. 3 depicts an example conceptual diagram of a PPDU for downstream communication using a time-domain technique for efficient channel loading.

FIG. 3 depicts an example conceptual diagram of a PPDU for downstream communication using a time-domain technique for efficient channel loading. FIG. 3 includes a PPDU 300 having a preamble 302, a frame control field 304, and a payload 305. The payload 305 includes a data symbol 306, a data symbol 308, a data symbol 310, and a data symbol 312. The data symbols 306 and 310 may include encoded data for transmission to a first client network device (e.g., client network device 207). The data symbols 308 and 312 may include encoded data for transmission to a second client network device (e.g., client network device 209). T4 represents the transmission time of the PPDU 300 on the communication medium 104. The frame generation unit 103 may generate the PPDU 300 for downstream communication from the master network device 102 to the client network devices 207 and 209 using the time-domain technique, as will be further described below with reference to FIGS. 5 and 6.

In some embodiments, to improve quality of service (e.g., to reduce latency and synchronization) while ensuring efficient channel utilization, the frame generation unit 103 can implement the time-domain technique for efficient channel loading. In the time-domain technique, the frame generation unit 103 can generate the PPDU 300 having the data symbols 306, 308, 310, and 312. In the example described above, the value of T4 is less than the value of (T1 +T2 +T3) and allows efficient channel utilization of the communication medium 104. Also, the PPDU 300 includes the encoded data for the client network device 207 and the client network device 209, which can lead to a reduced transmission latency to the client network device 209 and a reduced synchronization gap between the client network devices 207 and 209.

In some implementations, the frame generation unit 103 can generate the PPDU 300 which includes the data symbols 306, 308, 310, and 312 arranged in a predefined pattern in the payload of the PPDU 300. For example, the data symbols 306, 308, 310, and 312 may be arranged in a sequence known to the client network devices 207 and 209. The frame generation unit 103 may generate the PPDU 300 such that the PPDU 300 can be transmitted to multiple client network devices (e.g., the client network device 207 and the client network device 209) over the communication medium 104. For example, the frame control 304 in the PPDU 300 may include information about the lengths of transmission to each client network device. For example, the frame control 304 may indicate the lengths of the data symbols 306 and 310 that are intended for client network device 207, and the lengths of the data symbols 308 and 312 that are intended for client network device 209. The frame control field 304 may also include information about the destination addresses (e.g., network addresses of the client network devices 207 and 209) that allows the PPDU 300 to be transmitted to the client network device 207 and the client network device 209.

In some implementations, the frame generation unit 103 can generate the PPDU 300 with interleaved data symbols for the client network device 207 and the client network device 209. For example, the data symbol 306 (which includes encoded data for the client network device 207) may be followed by the data symbol 308 (which includes encoded data for the client network device 209). Similarly, the data symbol 308 may be followed by the data symbol 310 (which includes encoded data for the client network device 207), and so on in an interleaved pattern. The frame generation unit 103 may reduce the synchronization gap between the client network device 207 and the client network device 209 by interleaving the data symbols in the PPDU.

In some implementations, the frame generation unit 103 may determine tonemaps (i.e., a bit-loading scheme for different frequency carriers in a communication spectrum) to be utilized for communication with the client network devices 207 and 209. For example, the frame generation unit 103 may determine the tonemap to be utilized for communication with the client network device 207 based on channel characteristics of a transmission channel between the master network device 102 and the client network device 207. Similarly, the frame generation unit 103 may determine the tonemap to be utilized for communication with the client network device 209 based on channel conditions between the master network device 102 and the client network device 209. In some implementations, the frame generation unit 103 may utilize the same tonemap for communication of the symbols associated with the client network device 207 using the PPDU 300 which the master network device 102 utilizes for sending unicast transmissions (e.g., the PPDU 250 in FIG. 2) to the client network device 207. Similarly, the frame generation unit 103 may utilize the same tonemap for communication of the symbols associated with the client network device 209 using the PPDU 300 which the master network device 102 utilizes for sending unicast transmissions (e.g., the PPDU 252 in FIG. 2) to the client network device 209. As such, the frame generation unit 103 can improve channel utilization by using tonemaps adapted to channel conditions for communication with the client network devices 207 and 209.

In some implementations, the frame generation unit 103 may generate data symbols 306, 308, 310, and 312 having different data carrying capacities. For example, the data carrying capacity of a data symbol may be based on the channel conditions and the tonemap utilized for communications between the master network device 102 and the corresponding client network device. In one example, a data symbol allocated to the client network device 207 may have a carrying capacity of 120 bytes and a data symbol allocated to the client network device 209 may have a carrying capacity of 40 bytes due to the differences in channel conditions and tonemaps used for communications. In some implementations, the frame generation unit 103 may generate the PPDU 300 with equal data distribution for the client network devices 207 and 209. For example, when the master network device 102 is transmitting a 200 kbps audio stream to both the client network device 207 and the client network device 209, the master network device 102 should distribute data equally. In one example, when a data symbol allocated to the client network device 207 can carry 120 bytes and a data symbol allocated to the client network device 209 can carry 40 bytes, the frame generation unit 103 may allocate one data symbol (e.g., data symbol 306) having a carrying capacity of 120 bytes for the client network device 207, and allocate three data symbols (e.g., the data symbols 308, 310, and 312), each having a carrying capacity of 40 bytes, to the client network device 209 in order to achieve equal data distribution.

In another implementation, the frame generation unit 103 may generate the PPDU 300 with unequal data distribution for the client network devices. For example, when the master network device 102 sends a 2 mbps video stream to the client network device 207 and a 200 kbps audio stream to the client network device 209, then the ratio of data that should be distributed to the client network devices 207 and 209 is 10:1 (i.e., the data distribution to the client network devices 207 and 209 should be unequal and in accordance with a 10:1 ratio, respectively). The frame generation unit 103 can allocate the data symbols for carrying data to the client network devices 207 and 209 based on the determined ratio. For example, if a data symbol can carry 40 bytes of data to the client network device 207 and a data symbol can carry 12 bytes of data to the client network device 209, then the frame generation unit 103 may allocate three data symbols (e.g., the data symbols 306, 308 and 310) having a carrying capacity of 40 bytes to the client network device 207, and allocate one data symbol (e.g., the data symbol 312) having a carrying capacity of 12 bytes to the client network device 209 in order to achieve a 10:1 ratio in data distribution. It is noted that if the frame generation unit 103 cannot allocate the data symbols to meet the exact ratio for data distribution, the frame generation unit 103 can allocate the data symbols to the client network devices 207 and 209 based on a best available data distribution with respect to the corresponding ratio. For instance, with reference to the example described above, when a data symbol has a carrying capacity of 15 bytes of data (instead of 12 bytes of data) to the client network device 209, the frame generation unit 103 can still allocate the data symbols 306, 308, and 310 (having a carrying capacity of 40 bytes) to the client network device 207 and the data symbol 312 (having the carrying capacity of 15 bytes) to the client network device 209 to achieve the best available data distribution that is closest to the 10:1 ratio.

It is noted that, in some embodiments, the frame generation unit 103 may allocate data symbols to the client network devices 207 and 209 while taking into account expected variations in channel conditions. For example, when 90 bytes of data are to be sent to the client network device 207 in the PPDU 300 and a data symbol can carry 40 bytes of data, the frame generation unit 103 can allocate 3 data symbols (e.g., the data symbols 306, 308, and 310) instead of allocating 2 data symbols, even though the three data symbols have a total carrying capacity of 120 bytes. The additional capacity of the third data symbol may be used for safety margins for expected variations in channel conditions between the master network device 102 and the client network device 207.

In some implementations, the frame generation unit 103 may determine the sequence of the data symbols 306, 308, 310, and 312 based on priority of communication with the client network devices 207 and 209. For example, for a high priority communication (e.g., video streaming) between the master network device 102 and the client network device 207, the frame generation unit 103 may arrange the data symbols in the following order: 306, 310, 308, and 312. By arranging the data symbols 306 and 310 before the data symbols 308 and 312, the frame generation unit 103 can ensure that data symbols 306 and 310 (e.g., the video stream) are transmitted to the client network device 207 with reduced transmission latency.

In some implementations, acknowledgements may be sent sequentially from the client network devices 207 and 209 upon receiving the PPDU 300. For example, an acknowledgement may be sent from the client network device 207 to the master network device 102 on the communication medium 104 upon receiving the PPDU 300, followed by an acknowledgement from the client network device 209 to the master network device 102. It is noted that the PPDU 300 illustrates an example PPDU for transmission from the master network device 102 and, for simplicity, may not necessarily represent all fields of the PPDU for transmission from the master network device 102 to the client network devices 207 and 209.

Figure 4:
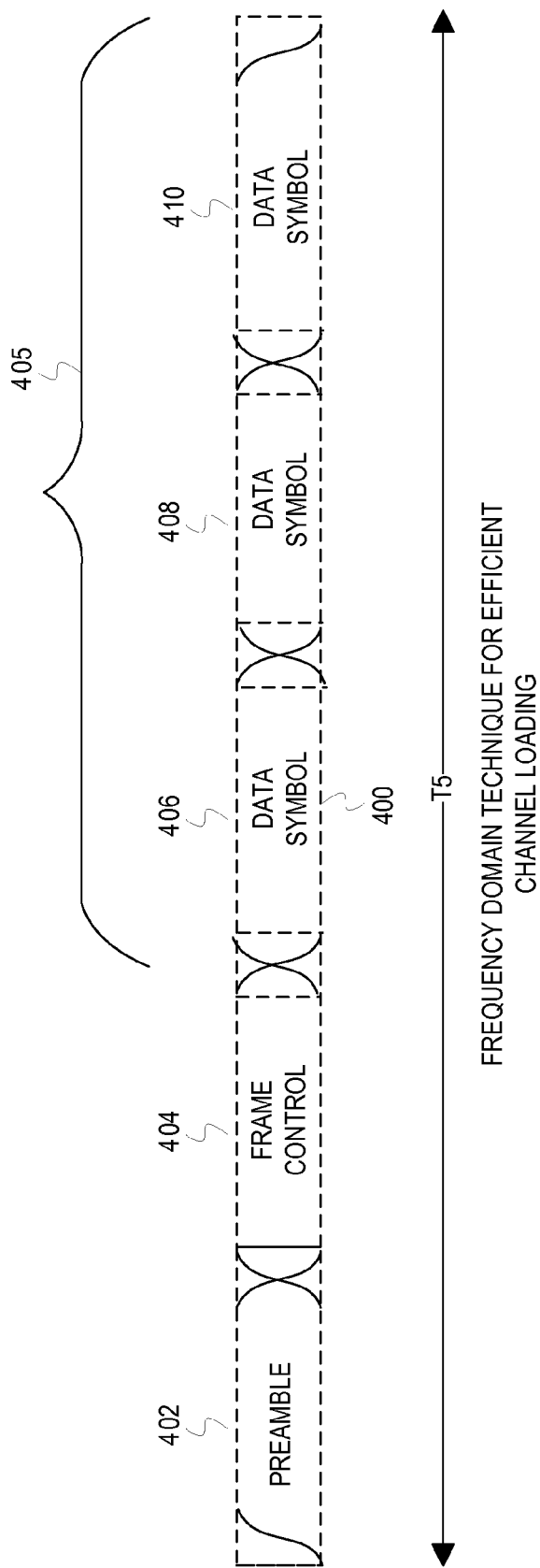
FIG. 4 depicts an example conceptual diagram of a PPDU for downstream communication using a frequency-domain technique for efficient channel loading.

FIG. 4 depicts an example conceptual diagram of a PPDU for downstream communication using a frequency-domain technique for efficient channel loading. FIG. 4 includes a PPDU 400 having a preamble 402, a frame control field 404, and a payload 405. The payload 405 includes a data symbol 406, a data symbol 408, and a data symbol 410. The data symbols 406, 408 and 410 may include encoded data for transmission to the client network devices 207 and 209. T5 represents the transmission time of the PPDU 400 on the communication medium 104. The frame generation unit 103 may generate the PPDU 400 for downstream communication from the master network device 102 to the client network devices 207 and 209 using the frequency-domain technique, as will be further described below with reference to FIGS. 7 and 8.

In some implementations, the frame generation unit 103 can generate the PPDU 400 including the data symbols 406, 408, and 410. The frame generation unit 103 may first allocate the frequency carriers to be utilized for communicating with the client network devices 207 and 209. For example, the frame generation unit 103 may determine the frequency carriers of each data symbol to allocate for the client network device 207 based on the channel characteristics of the transmission channel between the master network device 102 and the client network device 207. Also, the frame generation unit 103 may determine the frequency carriers of each data symbol to allocate to the client network device 209 based on the channel characteristics of the transmission channel between the master network device 102 and the client network device 209. In one implementation, the frame generation unit 103 may determine the frequency carriers based on a static partitioning technique (as described below). In another implementation, the frame generation unit 103 may determine the frequency carriers based on a dynamic partitioning approach (as described below). The frame generation unit 103 can then generate the PPDU 400 with the data symbols 406, 408, and 410. The data symbols 406, 408, and 410 may include the frequency carriers allocated to the client network devices 207 and 209. For example, each of the data symbols may include one or more frequency carriers allocated to the client network device 207, and one or more frequency carriers allocated to the client network device 209. In some implementations, the frame generation unit 103 may generate the PPDU 400 with a single data symbol (e.g., data symbol 406) including the frequency carriers allocated to a plurality of client network devices (e.g., the client network devices 207 and 209) in the communication network 100.

In some implementations, the frequency carriers of a data symbol may have different data carrying capacities. For example, the data carrying capacity of a frequency carrier may depend on the channel conditions between the master network device 102 and the corresponding client network device. In one example, a frequency carrier allocated to the client network device 207 may having a carrying capacity of 12 bytes and a frequency carrier allocated to the client network device 209 may having a carrying capacity of 4 bytes due to the difference in channel conditions. In some implementations, the frame generation unit 103 may generate the PPDU 300 with equal data distribution for the client network devices 207 and 209. For example, the frame generation unit 103 may allocate one of the frequency carriers having a carrying capacity of 12 bytes to the client network device 207, and allocate three frequency carriers having a carrying capacity of 4 bytes to the client network device 209 to achieve equal data distribution.

In another implementation, the frame generation unit 103 may generate the PPDU 300 with unequal data distribution for the client network devices. Similarly as described above, in one example, the ratio of data that should be distributed to the client network devices 207 and 209 is 10:1 (i.e., data distribution to the client network devices 207 and 209 should be unequal and according to a 10:1 ratio, respectively). The frame generation unit 103 can allocate frequency carriers of the data symbols for carrying data to the client network devices 207 and 209 based on the appropriate ratio to achieve unequal data distribution. It is noted that if the frame generation unit 103 cannot allocate the frequency carriers to meet the exact ratio for data distribution, the frame generation unit 103 can allocate the frequency carriers to the client network devices 207 and 209 based on a best available data distribution compared to the corresponding ratio. For example, the frame generation unit 103 can allocate the frequency carriers based on the available data carrying capacity such that the data distribution is closest to the corresponding ratio.

It is noted that, in some embodiments the frame generation unit 103 may allocate the frequency carriers to the client network devices 207 and 209 while taking into account expected variations in channel conditions. For example, when 10 bytes of data are to be sent to the client network device 207 in the PPDU 300 and each frequency carrier has a carrying capacity of 4 bytes to the client network device 207, the frame generation unit 103 can allocate three frequency carriers (with a total carrying capacity of 12 bytes) instead of just allocating two frequency carriers. The additional capacity of the third frequency carrier may be used for safety margins for expected variations in channel conditions between the master network device 102 and the client network device 207.

In some implementations, the frame generation unit 103 can construct the data symbols 406, 408 and 410 including the frequency carriers allocated to the client network devices 207 and 209. The frame generation unit 103 can determine the frequency carriers included in each of the data symbols and accordingly apportion encoded data to be carried by the data symbols. For example, the frame generation unit 103 can determine that the data symbol 406 includes certain frequency carriers allocated to the client network device 207 and certain frequency carriers allocated to the client network device 209. The frame generation unit 103 can construct the data symbol 406 having encoded data for both the client network devices 207 and 209. Similarly, the frame generation unit 103 can construct the data symbols 408 and 410. The frame generation unit 103 can improve channel utilization by using the frequency-domain technique to construct data symbols, as each data symbol is capable of carrying encoded data for a plurality of client network devices. In some cases, the value of T5 may be less than the value of T4 as the PPDU 400 may include less data symbols (e.g., three data symbols) to carry the encoded data as compared to the PPDU 300 (e.g., four data symbols) because the master network device can allocate the frequency spectrum to the client network devices more efficiently, as will be further described below. It is further noted that the client network devices 207 and 209 may receive data from the master network device 102 at the same time, which can also reduce the synchronization gap between the client network device 207 and the client network device 209.

In one implementation, the frame generation unit 103 can determine the frequency carriers to be allocated to the client network devices 207 and 209 for communication with the master network device 102 using the static partitioning technique. For example, in the static partitioning technique, the frame generation unit 103 can partition the communication frequency spectrum using a predefined pattern to determine the frequency carriers for the client network devices 207 and 209. The client network devices 207 and 209 may be aware of the predefined partitioning pattern used by the frame generation unit 103. In some implementations, the master network device 102 may use one of multiple predefined patterns. For example, a first predefined partitioning pattern may specify that a first half of the frequency carriers (e.g., frequency carriers in 0-15 MHz of a 30 MHz communication spectrum) may be utilized for communication with the client network device 207. Similarly, the first predefined partitioning pattern may specify that a second half of the frequency carriers (e.g., frequency carriers in 16-30 MHz of the 30 MHz communication spectrum) may be utilized for communication with the client network device 209. A second predefined partitioning pattern may specify utilizing interlaced frequency carriers in the communication spectrum for communication with the client network devices 207 and 209. The frame generation unit 103 may select one of the predefined partitioning patterns and inform the client network devices 207 and 209 about the selection. For example, the frame generation unit 103 may include the information about the predefined partitioning pattern utilized by the frame generation unit 103 in the frame control field 404 of the PPDU 400. In some implementations of the static partitioning technique, the frame generation unit 103 may select one of the multiple predefined partitioning patterns based on the existing channel characteristics of a transmission channel between the master network device 102 and the client network device 207, and existing channel characteristics of a transmission channel between the master network device 102 and the client network device 209.

In another implementation, the frame generation unit 103 may utilize a dynamic partitioning technique to allocate the frequency carriers for communication with the client network devices 207 and 209. For example, the frame generation unit 103 can determine the partitioning of the communication spectrum based on current channel characteristics of the transmission channels between the master network device 102 and each of the client network devices 207 and 209. In one implementation, the frame generation unit 103 may determine the partitioning pattern to partition the communication spectrum and communicate the partitioning pattern to each of the client network devices in the communication network 100. For example, the frame generation unit 103 can communicate the partitioning pattern to the client network devices using the frame control of the data frame that is transmitted to the client network devices. In another example, the frame generation unit 103 can communicate the partitioning pattern to the client network devices by a separate transmission.

In another implementation, certain client network devices in the communication network 100 may maintain global information about channel characteristics of different transmission channels in the communication network 100. The client network devices can then apply a set of partitioning rules to determine the partitioning pattern and the frequency carriers to be allocated to the client network devices based on the global information. In some implementations, based on information received from the master network device, the client network devices may determine to use one set of rules from a plurality of sets of rules (that are maintained in the global information) to determine the partitioning pattern. For example, the frame generation unit 103 can indicate the set of rules to be utilized by setting one or more bits in the frame control field of the data frame that is transmitted to the client network devices. By indicating the set of rules to be utilized, the frame generation unit 103 can save transmission time on the communication medium 104 and further improve the channel utilization.

After receiving the PPDU 400 from the master network device 102, each of the client network devices 207 and 209 can perform one or more operations on the PPDU 400 to decode and retrieve the data. In one implementation, when the frame generation unit 103 utilizes the static partitioning technique, the client network devices 207 and 209 can determine the frequency carriers allocated to them based on the predefined partitioning pattern used by the frame generation unit 103. The client network devices 207 and 209 can then decode the data symbols 406, 408, and 410 to obtain the encoded data on the respective frequency carriers allocated to the client network devices 207 and 209. In another implementation, when the frame generation unit 103 utilizes the dynamic partitioning technique, the client network devices 207 and 209 may determine the frequency carriers allocated to them based on a partitioning pattern received from the master network device 102. The client network devices 207 and 209 may also decode the frame control field 404 to determine the set of rules utilized by the frame generation unit 103 to determine the frequency carriers allocated to the client network devices 207 and 209. The client network devices 207 and 209 can then decode the data symbols 406, 408, and 410 to obtain the encoded data on the respective frequency carriers allocated to the client network devices 207 and 209.

In some implementations, acknowledgements may be sent sequentially from the client network devices 207 and 209 after receiving the PPDU 400. For example, an acknowledgement may be sent from the client network device 207 to the master network device 102 on the communication medium 104 after receiving the PPDU 400, followed by an acknowledgement from the client network device 209 to the master network device 102. It is noted that the PPDU 400 illustrates an example PPDU for transmission from the master network device 102 and, for simplicity, may not necessarily represent all fields of the PPDU for transmission from the master network device 102 to the client network devices 207 and 209.

Figure 5:
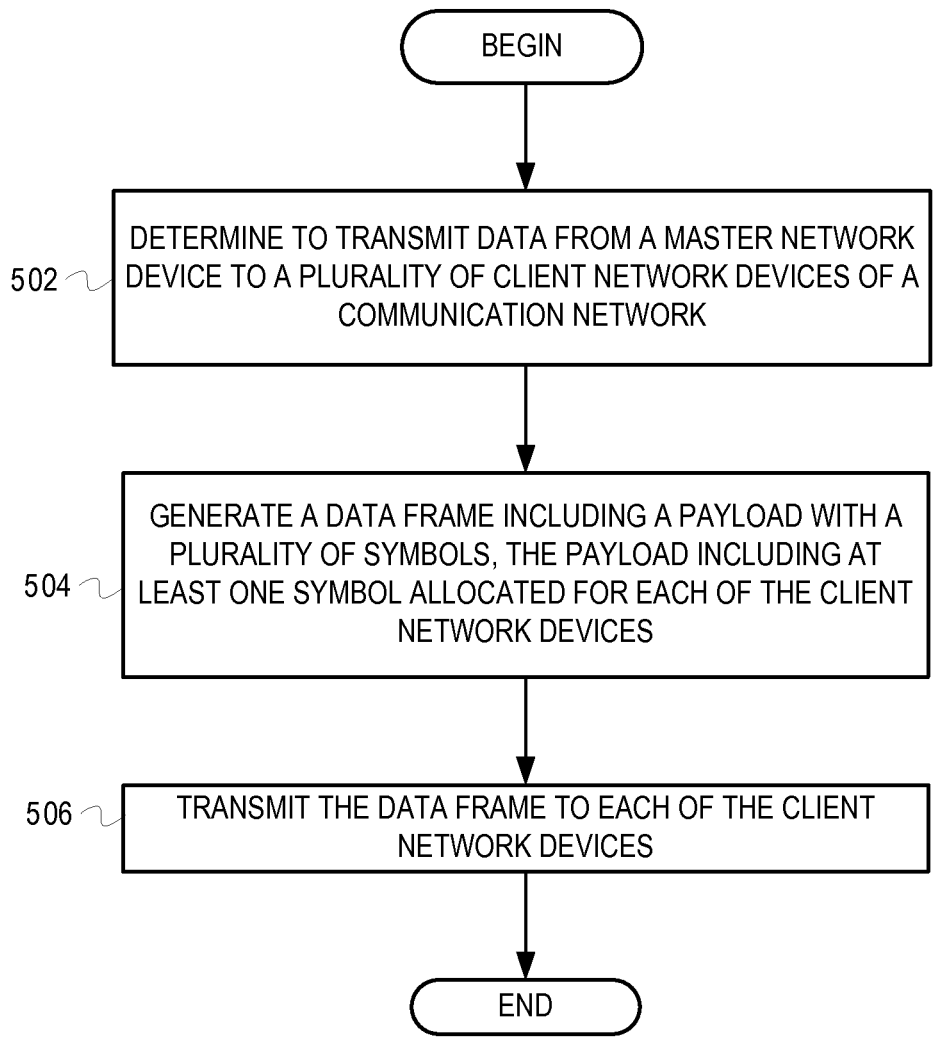
FIG. 5 illustrates a flow diagram of example operations for downstream communication from a master network device to a plurality of client network devices using a time-domain technique for efficient channel loading.

FIG. 5 illustrates a flow diagram of example operations for downstream communication from a master network device to a plurality of client network devices using a time-domain technique for efficient channel loading.

At block 502, it is determined to transmit data associated with a plurality of transmissions from a master network device to the client network devices of a communication network. In one implementation, the frame generation unit 103 of the master network device 102 (as described above with reference to FIG. 3) determines to transmit the data associated with the plurality of transmissions from the master network device 103 to the client network devices 207 and 209. For example, the frame generation unit 103 may receive data to be transmitted to the client network devices 207 and 209 from one or more applications (e.g., a video streaming application and an audio streaming application) being executed at the master network device 103. The flow continues to block 504.

At block 504, a data frame including a payload with a plurality of symbols is generated. The plurality of symbols include at least one symbol allocated for each of the client network devices. The plurality of symbols are arranged in a predefined pattern in the payload that is known to the client network devices (e.g., an interleaved pattern as shown in FIG. 3). In one implementation, the frame generation unit 103 determines the data to be transmitted to each of the client network devices 207 and 209 and generates the data frame including the payload with the plurality of symbols (e.g., as will be further described below in FIG. 6). For example, each of the data frames may include one or more data symbols associated with an audio stream being provided to the client network device 207, and one or more data symbols associated with a video stream being provided to the client network device 209). The flow continues to block 506.

Figure 6:
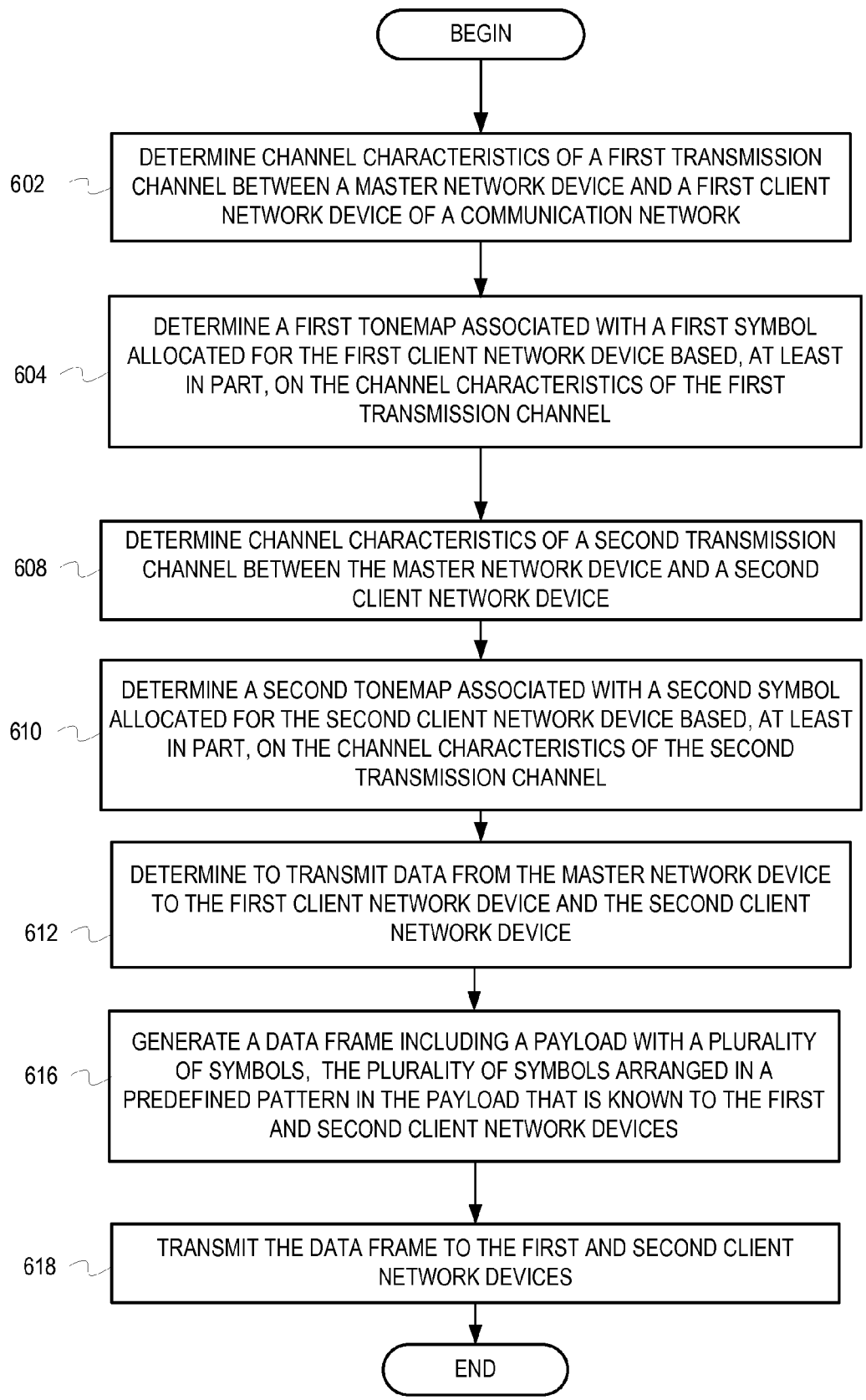
FIG. 6 illustrates a flow diagram of example operations for generating a data frame for downstream transmission from a master network device to a plurality of client network devices using a time-domain technique for efficient channel loading.

At block 506, the data frame is transmitted to each of the client network devices. In one implementation, the transmission unit 105 transmits the data frame to each of the client network devices. For example, the transmission unit 105 transmits the PPDU 300 to the client network devices 207 and 209. FIG. 6 describes various additional examples for implementing one-to-many communications using the time-domain technique, according to some embodiments.

FIG. 6 illustrates a flow diagram of example operations for generating a data frame for downstream transmission from a master network device to a plurality of client network devices using a time-domain technique for efficient channel loading.

At block 602, channel characteristics of a first transmission channel between a master network device and a first client network device are determined. In one implementation, the frame generation unit 103 determines the channel characteristics of the first transmission channel between the master network device 102 and the client network device 207. For example, the frame generation unit 103 determines available communication spectrum for transmission on the communication medium 104, noise distribution across the communication spectrum, and other suitable channel characteristics. The flow continues to block 604.

At block 604, a first tonemap associated with a first symbol allocated for the first client network device is determined based, at least in part, on the channel characteristics of the first transmission channel. In one implementation, the frame generation unit 103 determines the first tonemap associated with the first symbol allocated for the first client network device (e.g., the client network device 207). For example, the frame generation unit 103 determines the tonemap to transmit the data symbol 306 to the client network device 207. The frame generation unit 103 can determine the tonemap by determining a bit-loading scheme for the data symbol 306 (i.e., the number of bits to be loaded on each of the available frequency carriers in the communication spectrum). For example, based on the available communication spectrum and noise distribution across the communication spectrum (and other channel characteristics determined at block 602), the frame generation unit 103 can determine the tonemap associated with the data symbol 306. The flow continues to block 608.

At block 608, channel characteristics of a second transmission channel between the master network device and a second client network device are determined. In one implementation, the frame generation unit 103 determines the channel characteristics of the second transmission channel between the master network device 102 and the client network device 209. For example, the frame generation unit 103 determines available communication spectrum for communication on the communication medium 104, noise distribution across the communication spectrum, and other channel characteristics. The flow continues to block 610.

At block 610, a second tonemap associated with the second symbol allocated for the second client network device is determined based, at least in part, on the channel characteristics of the second transmission channel. In one implementation, the frame generation unit 103 determines the second tonemap associated with the second symbol allocated for the second client network device (e.g., the client network device 209). For example, the frame generation unit 103 determines the tonemap to transmit the data symbol 308 to the client network device 209. Similarly as described above in block 604, the frame generation unit 103 can determine the tonemap by determining a bit-loading scheme for the data symbol 308 (i.e., the number of bits to be loaded on each of the available frequency carriers in the communication spectrum). The flow continues to block 612.

At block 612, it is determined to transmit data from the master network device to the first client network device and the second client network device. In one implementation, the frame generation unit 103 determines that data is scheduled to be transmitted from the master network device 102 to the client network device 207 and the client network device 209. For example, the frame generation unit 103 may receive data associated with data symbols 306 and 310 from one or more applications executing at the master network device 102 for transmission to the client network device 207. Similarly, the frame generation unit 103 may receive data associated with data symbols 308 and 312 for transmission to the client network device 209. The flow continues to block 616.

At block 616, a data frame including a payload with a plurality of symbols is generated. The plurality of symbols is arranged in a predefined pattern in the payload that is known to the first and second client network devices. In one implementation, the frame generation unit 103 generates the data frame including the payload with the plurality of symbols. For example, the frame generation unit 103 generates the PPDU 300 including the data symbols 306, 308, 310, and 312 in the payload 305. The frame generation unit 103 can arrange the data symbols 306, 310, 308, and 312 in a predefined pattern known to the client network device 207 and the client network device 209. For example, the frame generation unit 103 arranges the data symbols 306, 310, 308, and 312 in an interleaved pattern. In this example, the data symbols 306 and 310 destined for the client network device 207 may be first and third, respectively, in the interleaved sequence of data symbols, and the data symbols 308 and 312 destined for the client network device 209 may be second and fourth, respectively, in the interleaved sequence of data symbols (e.g., as shown in FIG. 3). The flow continues to block 618.

At block 618, the data frame is transmitted to the first and second client network devices. In one implementation, the transmission unit 105 transmits the data frame to the client network devices 207 and 209. For example, the transmission unit 105 transmits the PPDU 300 to the client network devices 207 and 209 over the communication medium 104. The transmission unit 105 may insert the network addresses (e.g., IP address) of the client network devices 207 and 209 in one or more destination address fields of the PPDU 300. The transmission unit can utilize the tonemap determined at block 604 for transmitting the data symbols 306 and 310 via the PPDU 300. Similarly, the transmission unit 105 can utilize the tonemap determined at block 610 for transmitting the data symbols 308 and 312 via the PPDU 300. In some implementations, the transmission unit 105 may insert one or more fields for error detection and error correction (e.g., Checksum, Cyclic Redundancy Check, etc.) in the PPDU 300.

Figure 7:
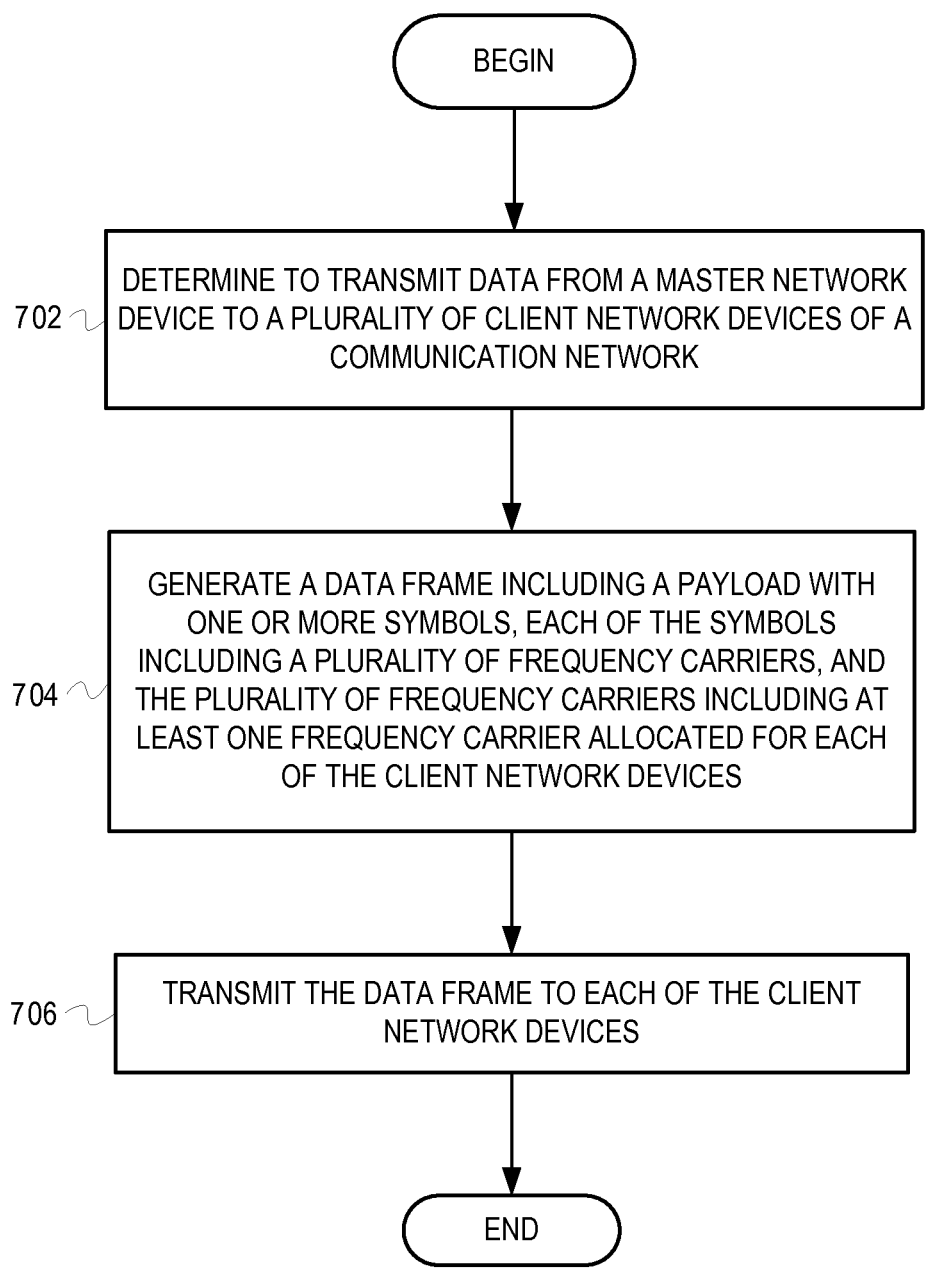
FIG. 7 illustrates a flow diagram of example operations for downstream communication from a master network device to a plurality of client network devices using a frequency-domain technique for efficient channel loading.

FIG. 7 illustrates a flow diagram of example operations for downstream communication from a master network device to a plurality of client network devices using a frequency-domain technique for efficient channel loading.

At block 702, it is determined to transmit data associated with a plurality of transmissions from a master network device to the client network devices of a communication network. In one implementation, the frame generation unit 103 (as described above with reference to FIG. 4), determines to transmit the data associated with the plurality of transmissions from the master network device 102 to the client network devices 207 and 209. For example, the frame generation unit 103 may receive the data to be transmitted to the client network devices 207 and 209 from one or more components of a communication unit of the master network device 103. The flow continues to block 704.

At block 704, a data frame including a payload with one or more symbols is generated. Each of the symbols includes a plurality of frequency carriers. The plurality of frequency carriers includes at least one frequency carrier allocated for each of the client network devices. The plurality of frequency carriers are allotted to the client network devices according to a partitioning pattern. In one implementation, the frame generation unit 103 determines the data to be transmitted to each of the client network devices 207 and 209 and generates the data frame including the payload with at least one symbol (e.g., as will be further described below with reference to FIG. 8). The flow continues to block 706.

Figure 8:
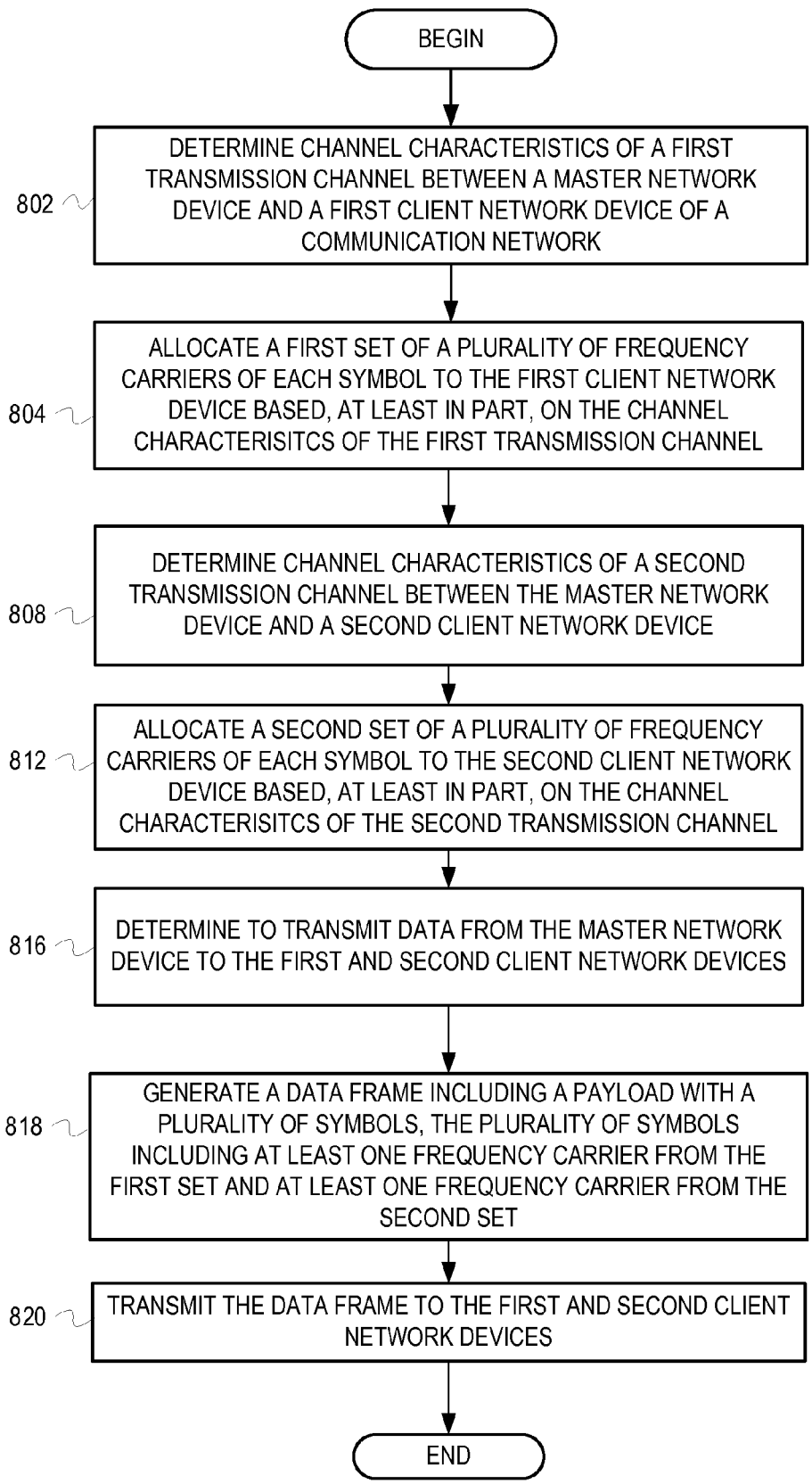
FIG. 8 illustrates a flow diagram of example operations for generating a data frame for downstream transmission from a master network device to a plurality of client network devices using a frequency-domain technique for efficient channel loading.

At block 706, the data frame is transmitted to each of the client network devices. In one implementation, the transmission unit 105 transmits the data frame to each of the client network devices. For example, the transmission unit 105 transmits the PPDU 400 to the client network devices 207 and 209. FIG. 8 describes various additional examples for implementing one-to-many communications using the frequency-domain technique, according to some embodiments.

FIG. 8 illustrates a flow diagram of example operations for generating a data frame for downstream transmission from a master network device to a plurality of client network devices using a frequency-domain technique for efficient channel loading.

At block 802, channel characteristics of a first transmission channel between a master network device and a first client network device of a communication network are determined. In one implementation, the frame generation unit 103 determines the channel characteristics of the first transmission channel between the master network device 102 and the client network device 207. For example, the frame generation unit 103 determines available communication spectrum for transmission on the communication medium 104, noise distribution across the communication spectrum, and other suitable channel characteristics. The flow continues to block 804.

At block 804, a first set of a plurality of frequency carriers associated with each symbol of a data frame is allocated to the first client network device based, at least in part, on the channel characteristics of the first transmission channel. In one implementation, the frame generation unit 103 allocates the first set of frequency carriers to the client network device 207 based, at least in part, on the channel characteristics of the first transmission channel (e.g., the transmission channel between the master network device 102 and the client network device 207). For example, the frame generation unit 103 can utilize the channel characteristics of the first transmission channel to determine frequency carriers in a communication spectrum that are least affected by the channel noise (or other channel conditions) on the communication medium 104. The frame generation unit 103 can then allocate the selected frequency carriers of each symbol to the client network device 207 when constructing the payload of each data frame. In this implementation, the frame generation unit 103 determines the partitioning pattern for allocating the frequency carriers of each symbol based on the channel conditions, which is one of the dynamic partitioning techniques described above with reference to FIG. 4. In some implementations, the frame generation unit 103 can allocate the frequency carriers of each symbol according to the static partitioning technique. For example, the frequency carriers of each symbol can be allocated according to an interleaved partitioning pattern. Additional examples of static or dynamic partitioning techniques are described above with reference to FIG. 4. The flow continues to block 808.

At block 808, channel characteristics of a second transmission channel between the master network device and a second client network device are determined. In one implementation, the frame generation unit 103 determines the channel characteristics of the second transmission channel between the master network device 102 and the client network device 209. For example, the frame generation unit 103 determines available communication spectrum for transmission on the communication medium 104, noise distribution across the communication spectrum, and other suitable channel characteristics. The flow continues to block 812.

At block 812, a second set of a plurality of frequency carriers of each symbol of a data frame is allocated to the second client network device based, at least in part, on the channel characteristics of the second transmission channel. In one implementation, the frame generation unit 103 allocates the second set of frequency carriers to the client network device 209 based, at least in part, on the channel characteristics of the second transmission channel (e.g., the transmission channel between the master network device 102 and the client network device 209). For example, the frame generation unit 103 can utilize the channel characteristics of the second transmission channel to determine frequency carriers in a communication spectrum that are least affected by the channel noise on the communication medium 104. The frame generation unit 103 can then allocate the selected frequency carriers of each symbol to the client network device 209 when constructing the payload of each data frame. As described above in block 604, in this implementation, the frame generation unit 103 determines the partitioning pattern for allocating the frequency carriers of each symbol based on the channel conditions, which is one of the dynamic partitioning techniques described above with reference to FIG. 4. In some implementations, the frame generation unit 103 can allocate the frequency carriers of each symbol according to the static partitioning technique or other dynamic partitioning techniques (e.g., as described above with reference to FIG. 4). The flow continues to block 816.

At block 816, it is determined to transmit data from the master network device to the first and second client network devices. In one implementation, the frame generation unit 103 determines that data is scheduled to be transmitted from the master network device 102 to the client network device 207 and the client network device 209. For example, the frame generation unit 103 may receive data from one or more applications executing at the master network device 102 for transmission to the client network device 207. Similarly, the frame generation unit 103 may receive data from one or more applications executing at the master network device 102 for transmission to the client network device 209. The flow continues to block 818.

At block 818, a data frame including a payload with a plurality of symbols is generated. The plurality of symbols includes at least one frequency carrier from the first set and at least one frequency carrier from the second set. In one implementation, the frame generation unit 103 generates the data frame (e.g., the PPDU 400) including the payload with the plurality of symbols (e.g., the data symbols 406, 408, and 410). For example, the frame generation unit 103 can determine to transmit the data destined for the client network device 207 over the first set of the plurality of frequency carriers (i.e., the frequency carriers allocated to the client network device 207). Similarly, the frame generation unit 103 can determine to transmit the data destined for the client network device 209 over the second set of the plurality of frequency carriers (i.e., the frequency carriers allocated to the client network device 209). The frame generation unit 103 can then generate the PPDU 400 including the data symbols 406, 408, and 410. The plurality of data symbols (i.e., the data symbols 406, 408, and 410) include at least one frequency carrier from the first set for the data destined for the client network device 207. Similarly, the plurality of data symbols includes at least one frequency carrier from the second set for the data destined for the client network device 209. The flow continues to block 820.

At block 820, the data frame is transmitted to the first and second client network devices. In one implementation, the transmission unit 105 transmits the data frame to the client network devices 207 and 209. For example, the transmission unit 105 transmits the PPDU 400 to the client network devices 207 and 209 over the communication medium 104. The transmission unit 105 may insert the network addresses (e.g., IP address) of the client network devices 207 and 209 in one or more destination address fields of the PPDU 400. In some implementations, the transmission unit 105 may insert one or more fields for error detection and error correction (e.g., Checksum, Cyclic Redundancy Check, etc.) in the PPDU 400.

It is noted that the flow diagrams 5-8 are exemplary in nature. Embodiments are not limited to the operations of the frame generation unit 103 and the transmission unit 105 described in the flow diagrams 5-8. In some embodiments, the frame generation unit 103 and the transmission unit 105 may perform more operations, fewer operations, operations in different order, operations in parallel, etc. For example, in some embodiments, operations for determining the channel characteristics of the first transmission channel (at block 602) and the operations for determining the channel characteristics of the second transmission channel (at block 608) may be performed in parallel. Similarly, the operations at block 604 and 610 may be performed in parallel; the operations at blocks 802 and 808 may be performed in parallel; and the operations at blocks 804 and 812 may be performed in parallel.

It is further noted that, the frame generation unit 103 may utilize the static partitioning technique or the dynamic partitioning technique (described in FIG. 4) to allocate the first set of the plurality of frequency carriers to the first client network device 207 (at block 804). Similarly, the frame generation unit 103 may utilize the static partitioning technique or the dynamic partitioning technique to allocate the second set of the plurality of frequency carriers to the second client network device 209 (at block 812).

It is further noted that the time-domain technique for channel loading and the frequency-domain technique for channel loading are not limited to implementation in communication networks having downstream communication with approximately equal data rates. In some implementations, the data rate from the master network device 102 to the client network device 207 and the data rate from the master network device 102 to the client network device 209 may be different. The time-domain technique and frequency-domain technique can be utilized in such communication networks. For example, in the time-domain technique, different data rates to the client network device 207 and the client network device 209 can be implemented by including an unequal number of data symbols for the client network devices 207 and 209 in the PPDU 300. In one implementation, the frame generation unit 103 may include a greater number of data symbols for the client network device 207 (compared to the number of data symbols for the client network device 209) in the PPDU 300 to support higher data rates for the client network device 207. Similarly, in the frequency-domain technique, different data rates to the client network device 207 and the client network device 209 can be implemented by allocating an unequal number of frequency carriers to the client network devices 207 and 209 in the communication spectrum. For example, the frame generation unit 103 may allocate greater number of frequency carriers to the client network device 207 (compared to the number of frequency carriers allocated to the client network device 209) in the PPDU 400 to support higher data rates to the client network device 207.

It is noted that, in some implementations, the frame generation unit 103 may determine to utilize the time-domain technique or the frequency-domain technique based on the communication medium utilized in the communication network 100. For example, for communication media which have low variation in channel characteristics (e.g., coaxial cable), the frame generation unit 103 may utilize the time-domain technique as using a fixed tonemap for transmission may be more efficient. For communication media which have greater variation in channel characteristics (e.g., powerline communication medium), the frame generation unit 103 may utilize the frequency-domain technique. It is also noted that in some embodiments, the frame generation unit 103 may utilize a combination of the time-domain technique and the frequency-domain technique for efficient channel loading. For example, in one implementation, the frame generation unit 103 may implement the combination of the time-domain technique and the frequency-domain technique inside a single PPDU. In one specific example, some of the symbols of the PPDU may be allocated data according to the time-domain technique, and the other symbols of the PPDU may be allocated data according to the frequency-domain technique. In another implementation, the frame generation unit 103 may implement the combination of the time-domain technique and the frequency-domain technique by generating some PPDUs for transmission using the time-domain technique and other PPDUs using the frequency-domain technique.

Although not illustrated in FIGS. 1-8, it is noted that, the client network devices 207 and 209 may include one or more units to detect and process the data frames received from the master network device 102. For example, the client network devices 207 and 209 may include one or more units to store information about the partitioning technique utilized by the master network device 102 to partition the communication spectrum and allocate one or more frequency carriers to the client network devices 207 and 209.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "unit," "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
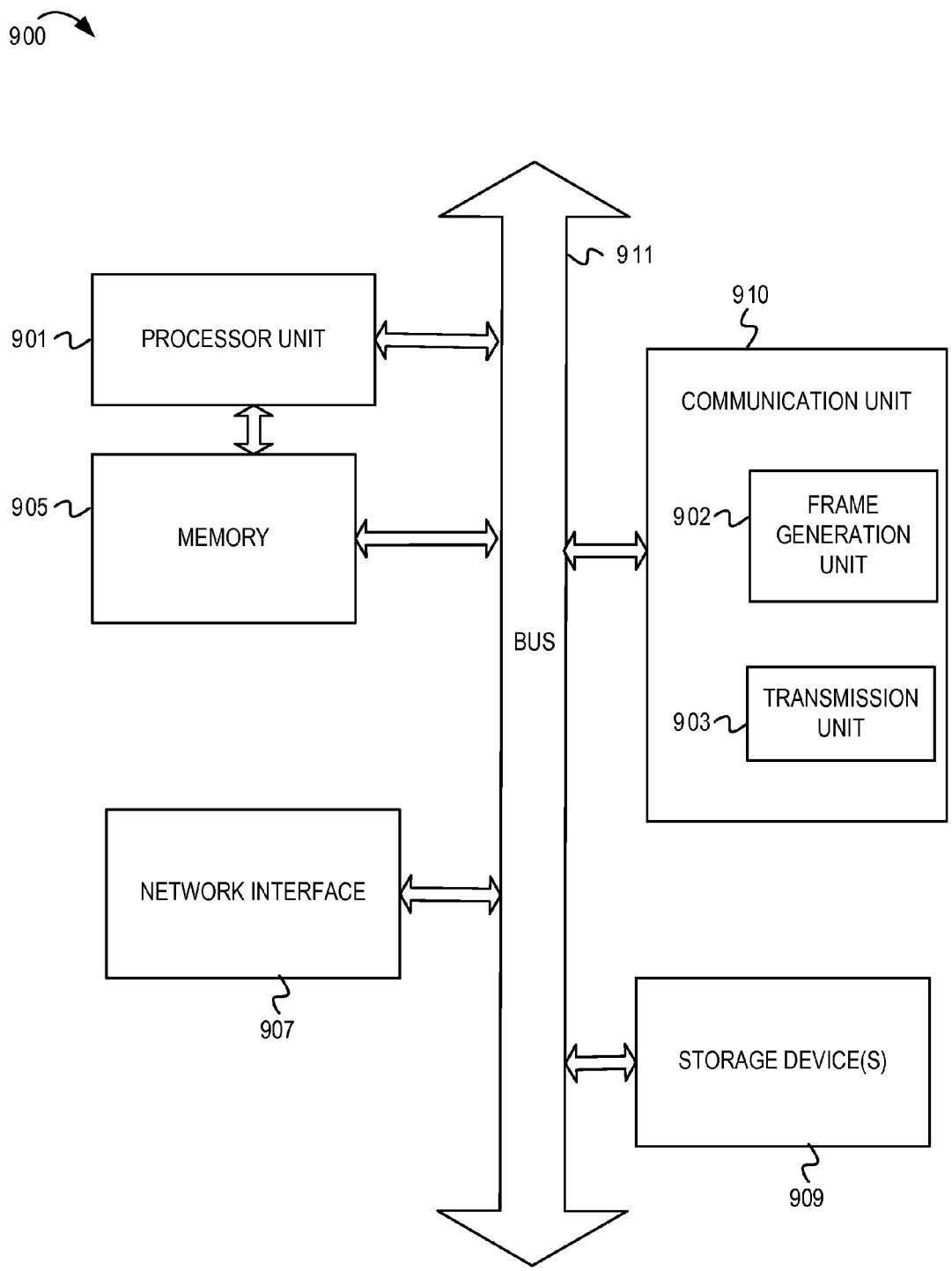
FIG. 9 depicts an example network device.

FIG. 9 depicts a block diagram of an example network device 900. In some implementations, the network device 900 may be a master network device such as a server, a network hub, a gateway/router, a home network controller, a gaming console, or other network device that performs downstream communication with a plurality of client network devices (e.g., using Ethernet-over-coax). The network device 900 includes a processor unit 901 (possibly including multiple processors, multiple cores, multiple nodes, and/or implementing multi-threading, etc.). The network device 900 includes memory 905. The memory 905 may be system memory (e.g., one or more of cache, SRAM, DRAM, zero capacitor RAM, Twin Transistor RAM, edam, EDO RAM, DDR RAM, EEPROM, NRAM, RRAM, SONOS, PRAM, etc.) or one or more of the above already described possible realizations of machine-readable media. The network device 900 also includes a bus 911 (e.g., PCI, PCI-Express, AHB™, AXI™, NoC, etc.), a communication unit 910, and a storage device(s) 909 (e.g., optical storage, magnetic storage, network attached storage, etc.), and a network interface 907 (e.g., an Ethernet interface, a Frame Relay interface, SONET interface, wireless interface, a PLC interface, etc.).

The communication unit 910 includes a frame generation unit 902 and a transmission unit 903. The frame generation unit 902 may include one or more hardware, firmware, and software components to generate data frames for one-to-many communications using at least one of a time-domain technique and/or a frequency-domain technique (as described above with reference to FIGS. 1-8). In one example, the frame generation unit 902 can utilize the channel characteristics and channel allocation information to generate a data frame for downstream communication from the network device 900 to two or more client network devices in a communication network. The transmission unit 903 may include one or more hardware, firmware, and software components to transmit the data frame generated by the frame generation unit 902 to each of the plurality of the client network devices.

Any one of these functionalities may be partially (or entirely) implemented in hardware and/or on the processor unit 901. For example, the functionality may be implemented with an application specific integrated circuit, in logic implemented in the processor unit 901, in a co-processor on a peripheral device or card, etc. In some embodiments, the communication unit 910 can each be implemented on a system-on-a-chip (SoC), an application specific integrated circuit (ASIC), or another suitable integrated circuit to enable communications of the network device 900. In some embodiments, the communication unit 910 may comprise additional processors and memory, and may be implemented in one or more integrated circuits on one or more circuit boards of the network device 900. Further, realizations may include fewer or additional components not illustrated in FIG. 9 (e.g., video cards, audio cards, additional network interfaces, peripheral devices, etc.). For example, in addition to the processor unit 901 coupled with the bus 911, the communication unit 910 may comprise at least one additional processor unit. The processor unit 901, the memory unit 905, and the network interfaces 907 are coupled to the bus 911. Although illustrated as being coupled to the bus 911, the memory unit 905 may be coupled to the processor unit 901.

While the embodiments are described with reference to various implementations and exploitations, it will be understood that these embodiments are illustrative and that the scope of the inventive subject matter is not limited to them. In general, techniques for implementing efficient channel loading for one-to-many communications as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for data transmission, the method comprising:
   determining, by a master network device, to transmit data from the master network device to a plurality of client network devices;
   generating, by the master network device, a data frame including a payload, the payload including a first plurality of symbols arranged in a pattern that is known to the plurality of client network devices; and
   allocating, by the master network device, at least one symbol of the first plurality of symbols to each of the plurality of client network devices, wherein at least a first symbol of the first plurality of symbols is allocated only to a first client network device of the plurality of client network devices.

2. The method of claim 1, wherein the data frame further includes a preamble and a frame control, and wherein at least a second symbol of the first plurality of symbols is allocated to a second client network device of the plurality of client network devices.

3. The method of claim 2, wherein the data frame is a physical layer protocol data unit (PPDU).

4. The method of claim 1, wherein a second symbol of the first plurality of symbols is allocated only to a second client network device of the plurality of client network devices, and a first bit loading scheme associated with a first tonemap is used for the first symbol and a second bit loading scheme associated with a second tonemap is used for the second symbol.

5. The method of claim 4, further comprising:
   determining first channel characteristics of a first transmission channel between the master network device and the first client network device;
   determining the first tonemap based, at least in part, on the first channel characteristics;
   determining second channel characteristics of a second transmission channel between the master network device and the second client network device; and
   determining the second tonemap based, at least in part, on the second channel characteristics.

6. The method of claim 1, further comprising:
   allocating the first plurality of symbols equally among the first client network device and a second client network device of the plurality of client network devices.

7. The method of claim 6, wherein the pattern is an interleaved pattern that is known to the first client network device and the second client network device.

8. The method of claim 1, further comprising:
   allocating the first plurality of symbols among the first client network device and a second client network device of the plurality of client network devices based, at least in part, on a data distribution ratio associated with the first client network device and the second client network device.

9. The method of claim 1, further comprising:
   determining that a first data rate associated with a first data transmission between the master network device and the first client network device is greater than a second data rate associated with a second data transmission between the master network device and a second client network device of the plurality of client network devices; and allocating a greater number of the first plurality of symbols to the first client network device compared to the second client network device.

10. The method of claim 1, wherein the payload further includes a second plurality of symbols, each of the second plurality of symbols having a plurality of frequency carriers, further comprising:
allocating at least one frequency carrier of each of the second plurality of symbols to each of the plurality of client network devices based, at least in part, on a partitioning pattern.

11. The method of claim 1, further comprising:
generating a second data frame including a payload, the payload including at least a first symbol having a plurality of frequency carriers; and
allocating at least one frequency carrier of the plurality of frequency carriers to each of the plurality of client network devices based, at least in part, on a partitioning pattern.

12. A master network device comprising:
a network interface;
a frame generation unit coupled with the network interface, the frame generation unit configured to:
determine to transmit data from the master network device to a plurality of client network devices;
generate a data frame including a payload, the payload including a plurality of symbols arranged in a pattern that is known to the plurality of client network devices; and
allocate at least one symbol of the plurality of symbols to each of the plurality of client network devices, wherein at least a first symbol of the plurality of symbols is allocated only to a first client network device of the plurality of client network devices.

13. The master network device of claim 12, wherein the data frame further includes a preamble and a frame control, and wherein at least a second symbol of the plurality of symbols is allocated to a second client network device of the plurality of client network devices.

14. The master network device of claim 12, wherein a second symbol of the plurality of symbols is allocated only to a second client network device of the plurality of client network devices, and a first bit loading scheme associated with a first tonemap is used for the first symbol and a second bit loading scheme associated with a second tonemap is used for the second symbol.

15. The master network device of claim 14, wherein the frame generation unit is further configured to:
determine first channel characteristics of a first transmission channel between the master network device and the first client network device;
determine the first tonemap based, at least in part, on the first channel characteristics;
determine second channel characteristics of a second transmission channel between the master network device and the second client network device; and
determine the second tonemap based, at least in part, on the second channel characteristics.

16. The master network device of claim 12, wherein the frame generation unit is further configured to:
allocate the plurality of symbols equally among the first client network device and a second client network device of the plurality of client network devices.

17. The master network device of claim 12, wherein the frame generation unit is further configured to:
allocate the plurality of symbols among the first client network device and a second client network device of the plurality of client network devices based, at least in part, on a data distribution ratio associated with the first client network device and the second client network device.

18. The master network device of claim 12, wherein the frame generation unit is further configured to:
determine that a first data rate associated with a first data transmission between the master network device and the first client network device is greater than a second data rate associated with a second data transmission between the master network device and a second client network device of the plurality of client network devices; and
allocate a greater number of the plurality of symbols to the first client network device compared to the second client network device.

19. A non-transitory machine-readable storage medium having instructions stored therein, which when executed by one or more processors of a master network device cause the master network device to perform operations that comprise:
determining to transmit data from the master network device to a plurality of client network devices;
generating a data frame including a payload, the payload including a plurality of symbols arranged in a pattern that is known to the plurality of client network devices; and
allocating at least one symbol of the plurality of symbols to each of the plurality of client network devices, wherein at least a first symbol of the plurality of symbols is allocated only to a first client network device of the plurality of client network devices.

20. The non-transitory machine-readable storage medium of claim 19, wherein the data frame further includes a preamble and a frame control, and wherein at least a second symbol of the plurality of symbols is allocated to a second client network device of the plurality of client network devices.

21. The non-transitory machine-readable storage medium of claim 19, wherein a second symbol of the plurality of symbols is allocated only to a second client network device of the plurality of client network devices, and a first bit loading scheme associated with a first tonemap is used for the first symbol and a second bit loading scheme associated with a second tonemap is used for the second symbol.

* * * * *